(12) United States Patent
Williams et al.

(10) Patent No.: US 7,445,403 B2
(45) Date of Patent: Nov. 4, 2008

(54) LIQUID BARRIER ASSEMBLY AND CONNECTOR THEREFOR

(76) Inventors: Nigel Roy Williams, 5 Budbury Tyning, Bradford-On-Avon, Wiltshire (GB) BA15 1QE; Richard Samuel Preston, 6 Green Lane, Trowbridge, Wiltshire (GB) BA14 7D8; Jamys John Warneford Peacock, 22 Hollins Street, Buxton, Derbyshire (GB) SK17 6UY; Stuart Edward White, The Bungalow, Old Farm Lane, Nether Whitacre, Coleshill (GB) B46 2DL; Gary John Ralph, Teasel Housecliff Square, Avoncliff, Bradford-On-Avon (GB) BA15 2HD; Adrian Lee Petty, 35 Magister Road, Bowerhill, Melksham, Wiltshire (GB) SN12 6FD; Christopher John Peacock, Woodvale, Gadley Lane, Buxton, Derbyshire (GB) SK17 6UY; David Boast, Chapel Path, Colerne, Chippenham, Wiltshire (GB) SN14 8DF ( * ) Notice: Subject to any disclaimer, the term of this patent is extended or adjusted under 35 U.S.C. 154(b) by 0 days.

(21) Appl. No.: 11/547,982

(22) PCT Filed: May 6, 2004

(86) PCT No.: PCT/GB2004/001957

§ 371 (c)(1),
(2), (4) Date: Oct. 10, 2006

(87) PCT Pub. No.: WO2004/099509

PCT Pub. Date: Nov. 18, 2004

(65) Prior Publication Data

US 2007/0077123 A1   Apr. 5, 2007

(30) Foreign Application Priority Data

May 6, 2003   (GB) .................. 0310329.8

(51) Int. Cl.
*E02B 3/10* (2006.01)

(52) U.S. Cl. ............ 405/107; 405/111; 405/114; 404/6

(58) Field of Classification Search ............ 405/107, 405/111, 114; 404/6
See application file for complete search history.

(56) References Cited

U.S. PATENT DOCUMENTS

| 4,869,617 | A | * | 9/1989 | Chiodo ............ 404/6 |
| 6,059,491 | A | * | 5/2000 | Striefel et al. ............ 405/111 |
| 6,588,979 | B1 | * | 7/2003 | Pasij ............ 405/114 |
| 2004/0190993 | A1 | * | 9/2004 | Archer-Simms et al. .... 405/110 |

* cited by examiner

*Primary Examiner*—Tara L. Mayo
(74) *Attorney, Agent, or Firm*—Watson IP Group, PLC; Jovan Jovanovic; Vladan Vasicjevic (57) ABSTRACT

The present invention relates to a liquid barrier assembly (1) comprising at least two barriers (2,3) each comprising a substantially rigid container and a front wall (5) against which liquid is intended to be incident. Adjacent barriers (2,3) are linked by a connector (12) which comprises a first relatively rigid portion (13) and a second relatively deformable portion (15). The portions (13, 15) are received in respective recesses defined in neighbouring side walls of adjacent barriers (2,3). The second portion (15) is deformed upon juxtaposition of adjacent barriers (2,3) in a predetermined manner so as to form an effective water-tight seal between the barriers (2,3).

20 Claims, 5 Drawing Sheets

LIQUID BARRIER ASSEMBLY AND CONNECTOR THEREFOR

BACKGROUND OF THE INVENTION

1. Field of the Invention

The present invention relates to a liquid barrier assembly and connector therefor for the prevention of flow of liquid from one area to an adjacent area and more particularly, but not exclusively, to such an assembly and connector for controlling the passage of fluvial or tidal water in areas prone to flooding.

2. Description of the Related Art

In England and Wales, approximately 5 million people, in 2 million properties, currently live in flood risk areas and 25 people have died as a result of flooding during 1999 and 2000. The Environment Agency of England and Wales estimates that over the coming century, sea levels are expected to rise by as much as half a metre as glaciers and snowfields melt due to changes in the global climate. As sea levels rise, so to will levels of rainfall and water levels in streams and rivers. Consequentially, larger areas of land, not only across the UK but throughout the world, will be placed under a greater risk of flooding and water damage of various kinds.

A great need therefore exists for a cost-effective, flexible and efficient method of water management that is capable of protecting valuable land and other resources as the threat of flood damage increases.

The most well-known method of retaining flood water involves constructing barriers composed of sandbags. Although this method is still widely used, it suffers from several disadvantages. One disadvantage is the amount of labour involved in filling and locating each bag. Another disadvantage is the high number of sandbags required to construct a wall of sufficient size for even relatively small levels of flooding. A further disadvantage is the arduous nature of the task of dismantling the wall after the flooding has subsided. When combined, these disadvantages serve to make the use of sandbags an extremely labour-intensive, costly and time-consuming process. Consequentially, alternative methods of water management have been proposed.

One example of an alternative water management system is a water-inflated barrier marketed by Aqua-Barriers™ and described in U.S. Pat. No. 5,865,564. This system uses large water-inflatable barriers to form coffer dams. Each barrier is typically between 50 and 100 foot long, produced with a flexible laminate structure comprising a base of woven polyester sandwiched between two layers of polyvinyl chloride and is formed as a single hollow tube with a perforated inner restraint diaphragm running along its length, designed to prevent it from rolling when in use. Additionally, each barrier can be joined to others to form longer structures if required. A disadvantage of this system is the need to evaluate various parameters, such as slope and grade, water depth, water velocity, anticipated water flows and related hydrological standards, prior to siting. Furthermore, expert advice is required to locate each barrier, significantly increasing both the cost and complexity of deploying the system.

Another example of a water management system is the Water Gate™ system marketed by MegaSecur Inc. This system uses barriers, each of which comprises a flexible plastic sheet constructed with a plurality of pockets. The plastic sheet is folded in a specific arrangement when not in use. When required each barrier is sited at a desired location and a securing "bib" manually unfolded. Gravel or sandbags are then placed on top of the "bib" to anchor each barrier in position. The remaining sheets that make up each barrier are allowed to unfold under the pressure of water incident upon them and the pockets open and fill with water to form a dam across the river. Each barrier can be joined to others to form longer structures if required. A disadvantage of this system is the potentially unreliable means by which each sheet is anchored. Another disadvantage, arising from the way in which the barrier is constructed, is that a very large barrier is required to hold back even modest heights of water. For example, a barrier with a depth of 7.4 m is required to retain a head of water 2 m high.

Our co-pending PCT application no. PCT/GB02/02450 describes a flood barrier assembly comprising a plurality of hollow barriers each with an aperture in its front face. In use, the barriers are connected together and sealed to each other to prevent the passage of water across them. An aperture in the front wall of each barrier permits water to enter the barrier thereby providing additional stability. Our co-pending UK patent application no. 0305758.5 discloses an alternative flood barrier assembly similar to that described in PCT/GB02/02450 which additionally comprises a flexible membrane secured to the front wall of the barriers by a plurality of porous connectors received in apertures defined in the front wall of the barriers.

In spite of the advantages provided by the assemblies described in our earlier patent applications a need still exists for a flexible, secure and water-tight means for connecting adjacent flood barriers to provide an improved flood barrier assembly. Furthermore, a need exists for a reliable means of securing flood barriers to the ground on which they are located.

The object of the present invention is to provide an assembly and associated connector suitable for water management and to obviate or mitigate the above-identified disadvantages.

SUMMARY OF THE INVENTION

According to a first aspect of the present invention there is provided a liquid barrier assembly for the prevention of flow of liquid from one area to an adjacent area, the assembly comprising first and second barriers each comprising a substantially rigid container, each barrier having a front wall against which, in use, liquid is intended to be incident, a base wall which is intended to be in contact with a support surface on which the barrier is to be located, and first and second opposite side walls each having a side groove defined therein, adjacent barriers being connectable to one another by a connector to form a liquid-tight seal between the barriers, wherein the connector comprises a first portion disposed in a first of said side grooves in the first barrier and a second portion projecting from said first of said side grooves, the first portion defining at least one resiliently deformable locking projection for locking engagement with a surface of the first side groove, the second portion being resiliently deformable and defining a plurality of resiliently deformable sealing projections, and wherein when the barriers are juxtaposed in a predetermined manner the second portion of the connector is received in a second groove of the second barrier and compressed such that it undergoes a predetermined deformation so that at least one of the sealing projections is forced towards a surface of the second side groove defined in the second barrier so as to form a liquid-tight seal therewith.

The assembly provides a secure and reliable manner by which the flow of liquid between areas may be controlled. It will be evident that the inventive assembly is particularly suitable for use as a flood barrier. For example, it may be installed in proximity to a river in an area where there is a flood risk. The barrier assembly may serve as a temporary, semi-permanent or permanent flood barrier.

Preferably, when the barriers are juxtaposed, a part of the second portion of the connector is located in a space between the side walls of adjacent first and second barriers such that, in use, said part is exposed to liquid pressure incident on the barriers, the pressure compressing the second portion so that it deforms further and one or more of the sealing projection(s) is forced further towards the surface of the second side groove of the second barrier thereby reinforcing the liquid-tight seal.

In this way, incident water which passes in to the space between adjacent barriers acts to enhance the strength of the liquid-tight seal between adjacent barriers.

The first and second portions of the connector may be integrally formed. The second portion of the connector may be approximately tubular or even hollow.

In one preferred embodiment the or each locking projection has an asymmetric cross section that is substantially deformable in one direction to permit insertion of the first portion of the connector in the first groove of said first barrier in a direction perpendicular to the plane of the side walls of the barriers and substantially resistant to deformation in the opposite direction to prevent substantial withdrawal of the first portion of the connector from the first side groove. The or each locking projection may have a saw-tooth cross section.

A section of the second portion of the connector from which the sealing projections extend is preferably substantially ovoid in cross section and the sealing projections may be generally triangular in cross section.

The connector is preferably elongate and may extend commensurate with the height of one of the barriers.

Adjacent barriers are ideally angularly displaceable relative to one another about the connector parallel to the plane of the support surface.

The connector may be formed from an elastomeric material.

The assembly may further comprise a base groove defined in the base wall of at least one of the first and second barriers and an anchoring connector comprising a first portion for disposition in the base groove and a second portion projecting therefrom, the first portion having at least one resiliently deformable locking projection for locking engagement with a surface of the base groove, and the second portion being resiliently deformable and defining a plurality of resiliently deformable sealing projections, wherein when the barrier is placed on the support surface the second portion of the connector is designed to be received in a channel defined in the support surface so as to form a liquid tight seal therewith. The anchoring connector is substantially to the same design as the connector referred to above.

According to a second aspect of the present invention there is provided a liquid barrier connector for connecting first and second barriers and comprising a first portion for disposition in a first groove of the first barrier and a second portion that projects from the first portion and is designed to be received in a second groove in a second barrier, the first portion defining at least one resiliently deformable locking projection for locking engagement with a surface of the first groove, the second portion being resiliently deformable and defining a plurality of resiliently deformable sealing projections, wherein, in use, when the barriers are juxtaposed in a predetermined manner the second portion of the connector is received in the second groove of the second barrier and compressible such that it can undergo a predetermined deformation so that at least one of the sealing projections is forced towards a surface of the second groove defined in the second barrier so as to form a liquid-tight seal therewith.

BRIEF DESCRIPTION OF THE DRAWINGS

An embodiment of the present invention will now be described, by way of example only, with reference to the accompanying drawings in which.

DETAILED DESCRIPTION OF THE DRAWINGS

Figure 1:
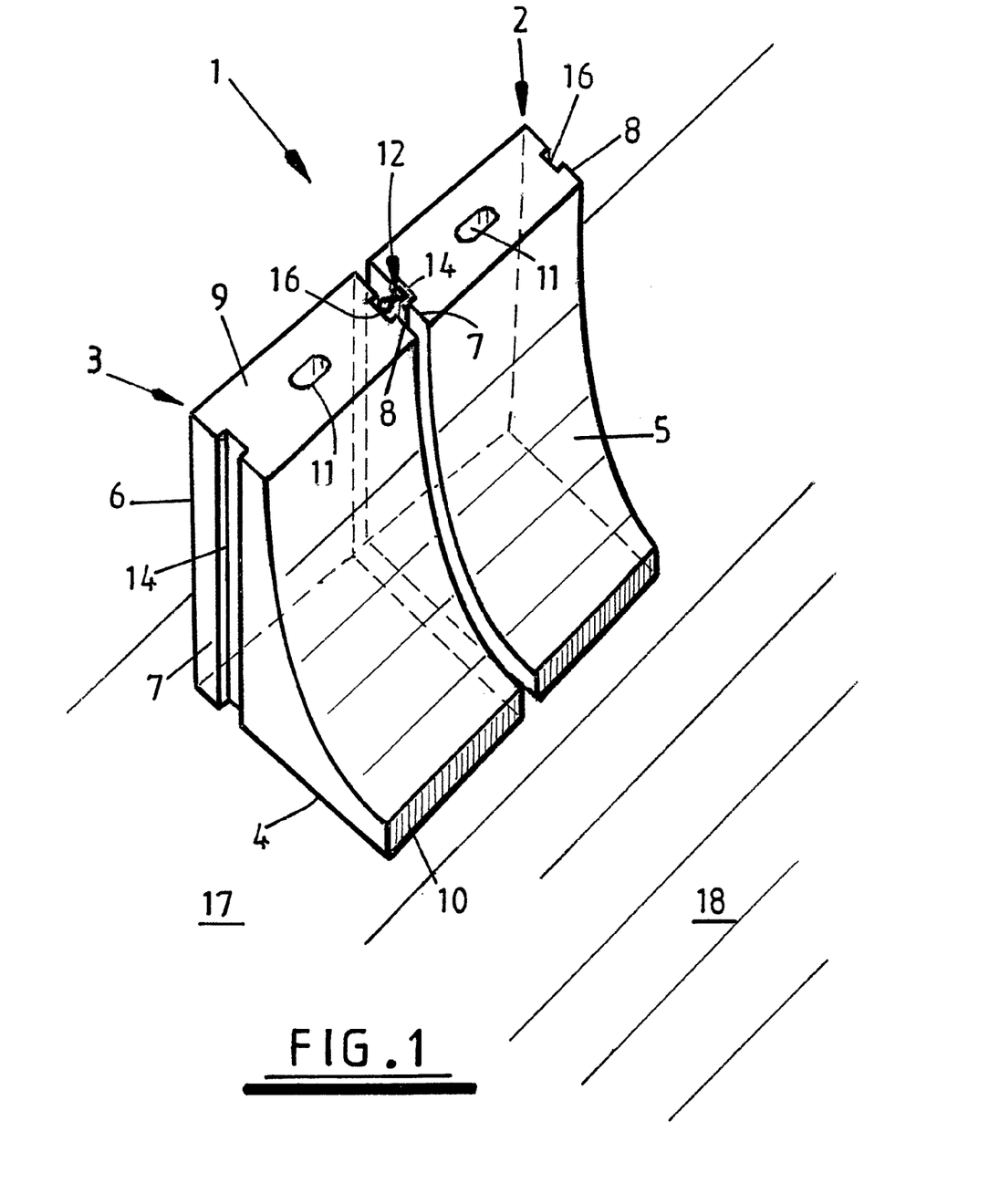
FIG. 1 is a perspective view from above of two barriers connected to form an assembly in accordance with the present invention.

Referring to FIG. 1, a water barrier assembly 1 for use in retaining flood water comprises first and second adjacent barriers 2, 3 formed from a plastic material such as polyethylene or polypropylene. Each barrier 2, 3 is a hollow body having base, front, rear, opposite first and second side, and top walls 4, 5, 6, 7, 8, 9 that define an interior chamber.

The base wall 4 is planar and rectangular in plan and is connected to a planar top wall 9 of significantly smaller dimension by upright first and second side walls 7, 8, an upright rear wall 6 and an inclined front wall 5. The front wall 5 is generally arcuate and is connected to the base wall 4 by a short upright lower wall 10. The top wall 9 has an access aperture 11. The purpose of the aperture 11 is two-fold. First, it may be designed to receive any suitable connector (not shown) for lifting tackle so as to facilitate lifting and transporting of the barrier 2, 3 to its desired location. The exact form and location of the connector can be altered to suit the method of lifting to be used. Second, the aperture 11 can be used to deposit ballast material, such as water, wet sand, concrete or any other suitable aggregate into the chamber.

The first and second barriers 2, 3 are linked to one another by an extruded elastomeric connector 12 that comprises a relatively rigid first portion 13 that is received in a groove 14 defined in side wall 7 of the first barrier 2. The first portion 13 is integrally formed with a deformable second portion 15 that is received in a groove 16 defined in side wall 8 of the second barrier 3. In FIG. 1, the assembly 1 is shown located on the bank 17 of a river 18. The connector is shown between the barriers in FIG. 2 and in isolation in FIG. 6.

Figure 2:
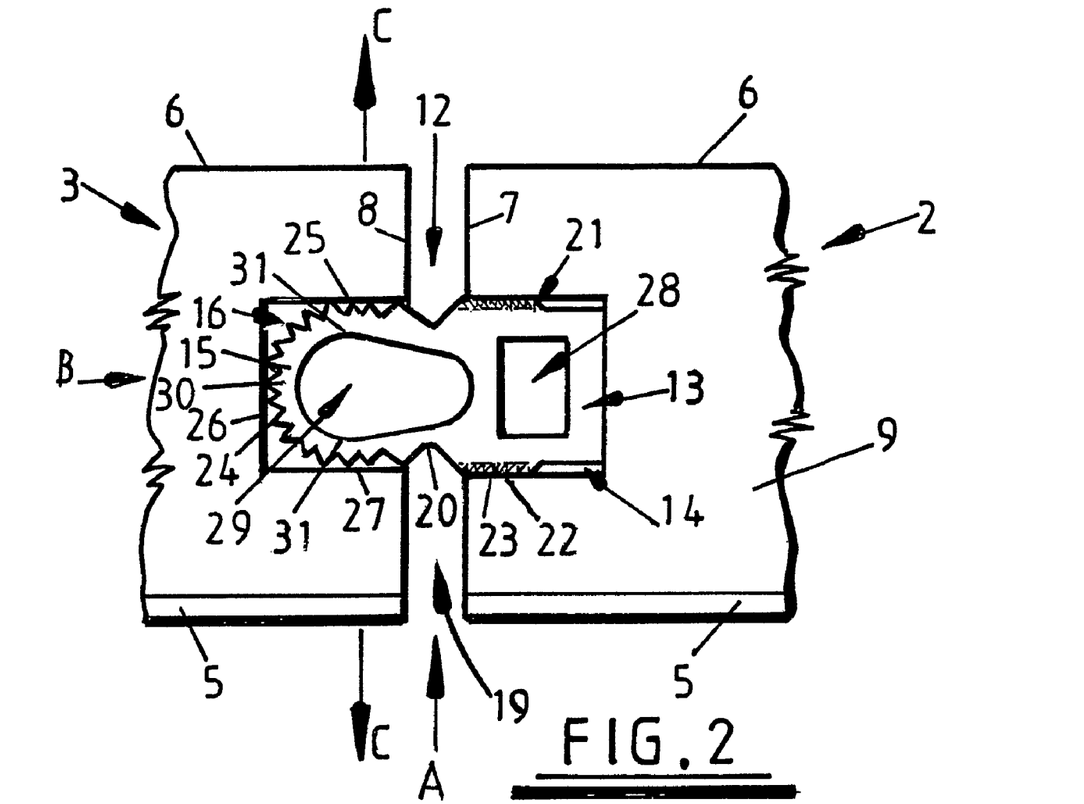
FIG. 2 is an enlarged sectioned view of the connection between the barriers of FIG. 1.
Figure 3:
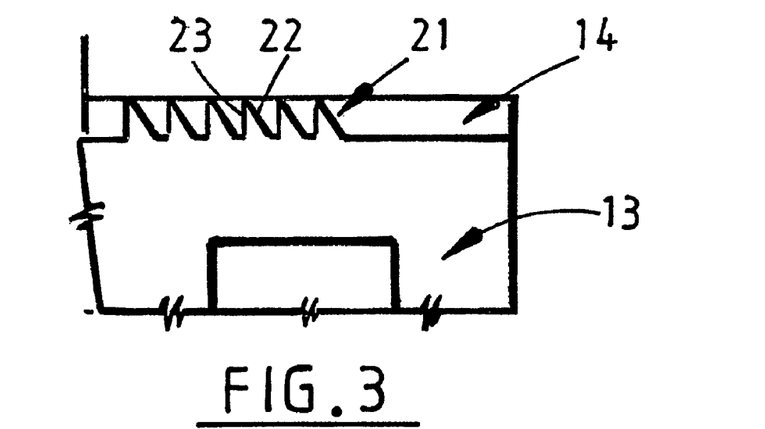
FIG. 3 is a detailed view of a section of FIG. 2.

When the barriers 2, 3 are juxtaposed, water incident on the barriers 2, 3 in the direction of arrow A can seep into the clearance 19 between the barriers and contact a waste area 20 of the connector 12 (described in more detail below). The first portion 13 of the connector 12 is substantially rectangular in cross section and has two series of relatively small asymmetric saw-tooth projections 21 formed integrally on its outer surface. Each saw-tooth projection 21 has an inclined face 22 and a straight face 23 (shown in more detail in FIG. 3) and is designed to flex relatively easily in the direction towards the groove opening but not in the opposite direction. This permits easy insertion of the first portion 13 of the connector 12 into the groove 14 in a direction perpendicular to the side wall 7 but the lack of flexure in the other direction prevents subsequent removal out of the groove. In this way, the saw-tooth projections 21 act to lock the first portion 13 of the connector 12 in groove 14. The second portion 15 of the connector 12 is approximately ovoid in cross section and has a plurality of ribs 24 integrally formed on its outer surface, each of which has a symmetrical approximately triangular cross section and is designed to form a water-tight seal against an inner surface 25, 26, 27 of the groove 16.

Figure 6:
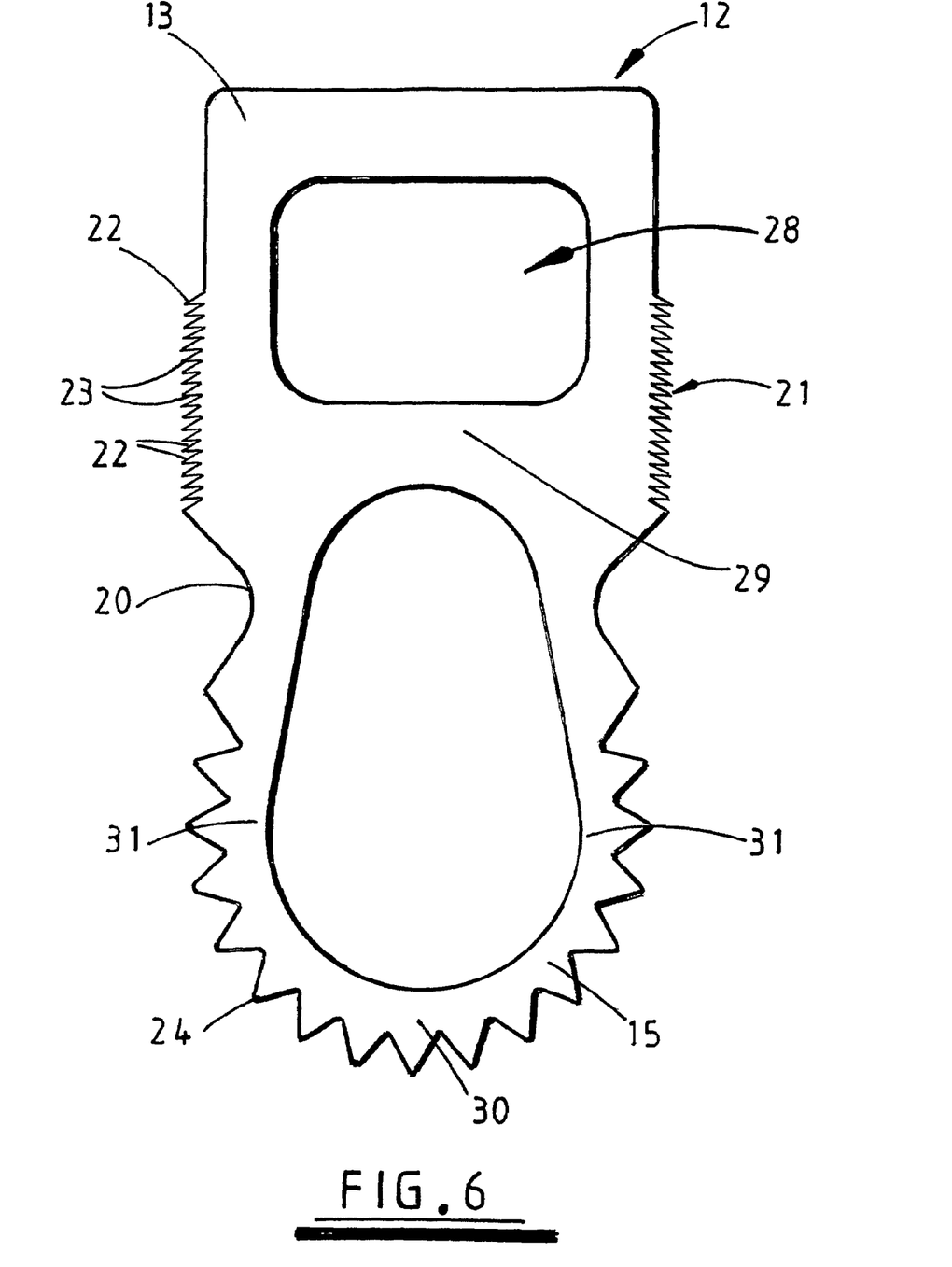
FIG. 6 is a close up view of a connector that forms part of the connection of FIG. 2.

The first portion 13 of the connector 12 is hollow (as indicated by reference numeral 28). This affects the deformability of the first portion and also reduces the amount of material required to form the connector 12. The centre of the second portion 15 of the connector 12 is also hollow such that it defines a deformable ring. The deformability of the ring is dependent upon its size, shape and the characteristics of the material composition from which it is constructed and therefore can be designed to suit the application concerned. The first and second portions are separated by an integral web 29. The saw-tooth projections are defined from a location partway along the outer surface of the first portion of the connector and extend along the outer surface of the integral web 29.

In the region between the integral web 29 and the ribs 24, the outer surface of the connector has an arcuate recess on each side to define the waist area 20.

When the connector 12 is located within the grooves 14, 16 and the barriers 2, 3 are brought together the surface 26 of the groove 16 acts against the end 30 of the second portion 15 of the connector 12 so as to deform it inwardly towards the first portion 13 in the direction of arrow B. This, in turn, causes regions 31 of the second portion 15 to deform outwardly in the direction of arrows C. In this way, when the connector 12 is located in situ between the two adjacent barriers 2, 3 some of the ribs 24 engage inner surfaces 25, 27 of the groove 16 with sufficient force to form a water-tight seal.

When water from the river 18 is incident upon the assembly 1, some may seep into the space 19 defined between adjacent barriers 2, 3 in the direction of arrow A. The water is incident on the narrowed part 20 of the second portion 15 and the compressive load it applies causes outward deformation of the regions 31 of the second portion 15 in the direction of arrows C. The sealing between the ribs 24 and the inner surfaces 25, 27 of the groove 16 is thus reinforced.

The inherent flexibility of the connector 12 allows the first barrier 2 to be angularly displaceable to a limited degree relative to the second barrier 3. The generally radial arrangement of the ribs 24 on the surface of the second portion 15 of the connector 12 in combination with the outward deformation of the regions 31 of the second portion 15 ensures that the water-tight seal is maintained during rotation of the first barrier 2 relative to the second barrier 3.

Figure 4:
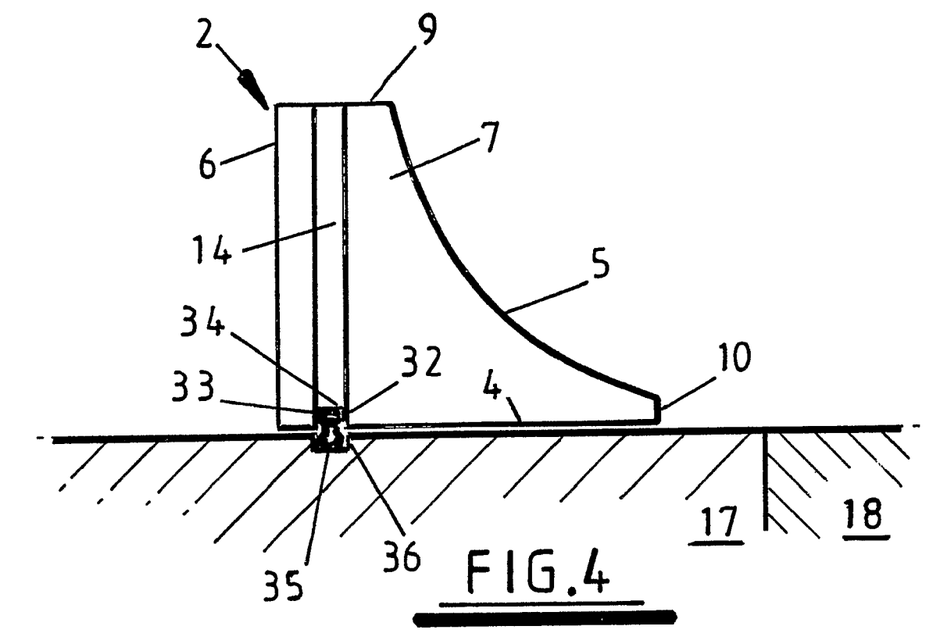
FIG. 4 is a part cross-sectional side view of one of the barriers forming part of the assembly shown in FIG. 1 with an anchor member attached.
Figure 5:
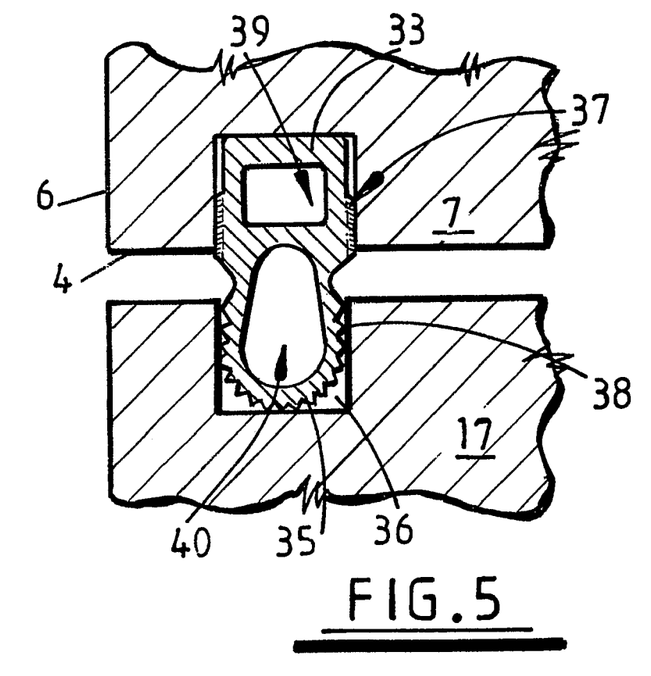
FIG. 5 is an enlarged part cross-sectional side view of the anchor member of FIG. 4 in situ.

FIGS. 4 and 5 illustrate how a connector such as that described above can be used as an anchor member 32 to secure the barrier 2 to the riverbank 18. The anchor member 32, like the connector, comprises a first portion 33 received in a horizontal groove 34 defined in the base wall 4 of the barrier 2 and a second portion 35 received in a horizontal groove 36 formed in the riverbank 18. The groove 36 can be lined with any convenient material, such as plastic or concrete. FIG. 5 illustrates the means of anchoring the barrier 2 in more detail. The first portion 33 of anchor member 32 comprises a plurality of relatively small saw-tooth projections 37 defined on its outer surface and the second portion 35 comprises a plurality of relatively large triangular projections 38 defined on its outer surface. Central sections of the first and second portions 33, 35 of the anchor member 32 are hollow as before to define cavities 39, 40. The anchor member 32 functions to create a water-tight seal between the base wall 4 of the barrier 2 and the riverbank 18 in exactly the same way as the connector 12 creates a water-tight seal between adjacent barriers 2, 3 and therefore this will not be described in any further detail.

Figure 7:
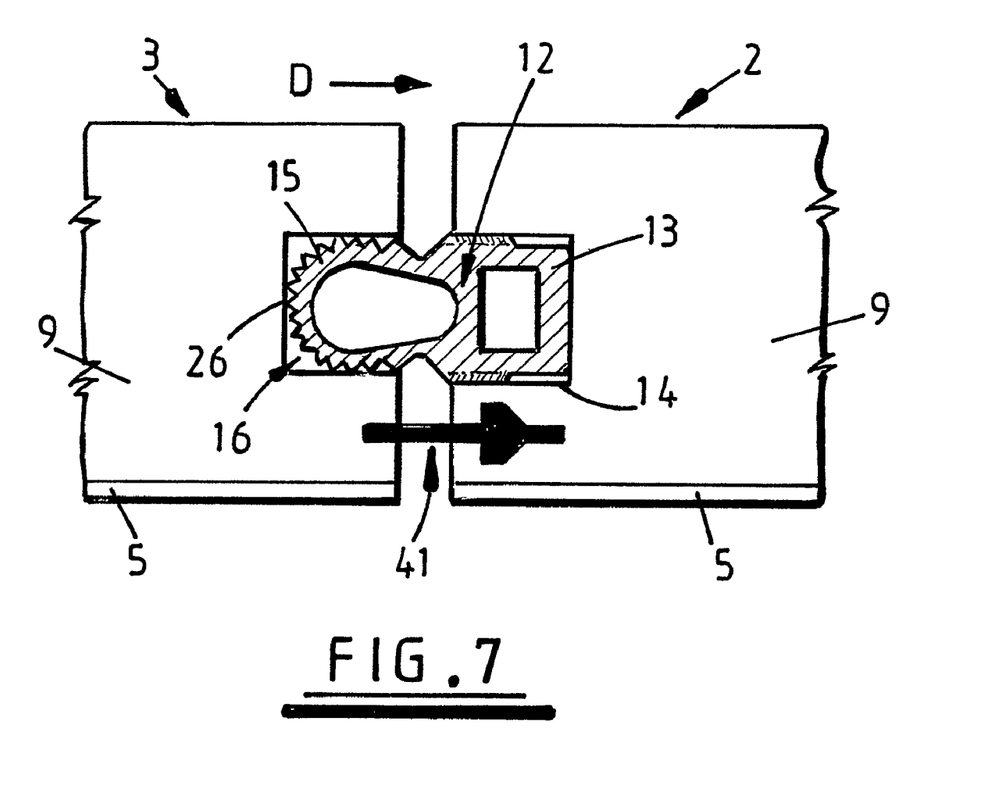
FIG. 7 is an enlarged plan view of the connection between the barriers of FIG. 1, the barriers being shown slightly apart and fitted with an over-centre lever.

When the barrier assembly 1 is to be constructed the first portion 13 of the connector 12 and the first portion 33 of the anchor member 32 (which may be integral) are first inserted and locked in their respective grooves 14, 34 in the first barrier 2. The first barrier 2 is then presented to groove 36 in the riverbank 18 and the anchor member forms a water-tight seal therewith. The second barrier 3 is presented to the first barrier 2 such that the second portion 15 of the connector 12 is loosely received within the groove 16 in the second barrier 3. As shown in FIG. 7, a specially adapted over-centre lever 41 fixed to the first barrier 2 is then used to draw the second barrier 3 towards the first barrier 2 in the direction of arrow D in a carefully controlled manner such that the first and second barriers are juxtaposed a predetermined distance apart. By controlling the final separation of the barriers 2, 3 the optimum force can be applied by the inner surface 26 of groove 16 to the end 30 of the second portion 15 of connector 12 so as to cause regions 31 to deform outwardly to a predetermined extent and ensure the projections 24 form a water-tight seal with inner surfaces 25, 27 of the groove 16. This process can then be repeated the required number of times with subsequent barriers to form the length of barrier assembly required.

It will be understood that numerous modifications can be made to the embodiment of the invention described above without departing from the underlying inventive concept and that these modifications are intended to be included within the scope of the invention. For example, the shape of the front face of the barrier against water is intended to be incident may be curved, straight, inclined or take any convenient form which can function satisfactorily to retain advancing water. In addition, any suitable shape can be used for the rear face, side walls and base of the barrier.

It will be evident to the skilled person that the features of the inventive connector/anchor member described herein can be combined with the barrier designs described in our co-pending PCT application (no. PCT/GB02/02450) and UK patent application (no. 0305758.5). For example, a plurality of apertures can be provided in the front face of the barrier to admit incident water to function as ballast material. Additionally, a flexible membrane can be secured to the front wall of the barriers by a plurality of porous connectors received in the apertures defined in the front wall of the barrier.

The precise shape of the two portions of the connector/anchor member may take a number of different forms so long as the functional interaction between the portions and the respective grooves in to which they are received is retained. For example, the relative deformability of the two portions can be provided by the intrinsic properties of the material from which they are formed. Each portion can be made from the same material or from different materials and central cut-away sections can take any convenient size and shape to tailor the deformability of the respective portions to suit a particular application.

The use of the specially adapted over-centre lever is optional and may be replaced by any appropriate means for locating adjacent barriers the requisite distance apart so as to cause the necessary deformation of the connector to create the water-tight seal.

It will also be understood that the assembly hereinbefore described would be equally well suited to the control and containment of any kind of liquid in addition to water, such as slurry.

What is claimed is:

1. A liquid barrier assembly for the prevention of flow of liquid from one area to an adjacent area, the assembly comprising first and second barriers each comprising a substantially rigid container, each barrier having a front wall against which, in use, liquid is intended to be incident, a base wall which is intended to be in contact with a support surface on which the barrier is to be located, and first and second opposite side walls each having a side groove defined therein, adjacent barriers being connectable to one another by a connector to form a liquid-tight seal between the barriers, wherein the connector comprise a first portion disposed in a first of said side grooves in the first barrier and a second portion projecting from said first of said side grooves, the first portion defining at least one resiliently deformable locking projection for locking engagement with a surface of the first side groove, the second portion being resiliently deformable and defining a plurality of resiliently deformable sealing projections, and wherein when the barriers are juxtaposed in a predetermined manner the second portion of the connector is received in a second groove of the second barrier and compressed such that it undergoes a predetermined deformation so that at least one of the sealing projections is forced towards a surface of the second side groove defined in the second barrier so as to form a liquid-tight seal therewith.

2. A liquid barrier assembly according to claim 1, wherein, when the barriers are juxtaposed, a part of the second portion of the connector is located in a space between the side walls of adjacent first and second barriers such that, in use, said part is exposed to liquid pressure incident on the barriers, the pressure compressing the second portion so that it deforms further and one or more of the sealing projection (s) is forced further towards the surface of the second side groove of the second barrier thereby reinforcing the liquid-tight seal.

3. A liquid barrier assembly according to claim 1, wherein the first and second portions of the connector are integrally formed.

4. A liquid barrier assembly according to claim 1, wherein the second portion of the connector is approximately tubular.

5. A liquid barrier assembly according to claim 4, wherein the second portion of the connector is hollow.

6. A liquid barrier assembly according to claim 1, wherein the or each locking projection has an asymmetric cross section that is substantially deformable in one direction to permit insertion of the first portion of the connector in the first groove of said first barrier in a direction perpendicular to the plane of the side walls of the barriers and substantially resistant to deformation in the opposite direction to prevent substantial withdrawal of the first portion of the connector from the first side groove.

7. A liquid barrier assembly according to claim 6, wherein the or each locking projection has a saw-tooth cross section.

8. A liquid barrier assembly according to claim 1, wherein a section of the second portion of the connector from which the sealing projections extend is substantially ovoid in cross section.

9. A liquid barrier assembly according to claim 1, wherein the sealing projections are generally triangular in cross section.

10. A liquid barrier assembly according to claim 1, wherein the connector is elongate.

11. A liquid barrier assembly according to claim 1, wherein the connector extends commensurate with the height of one of the barriers.

12. A liquid barrier assembly according to claim 1, wherein adjacent barriers are angularly displaceable relative to one another about the connector parallel to the plane of the support surface.

13. A liquid barrier assembly according to claim 1, wherein the connector is formed from an elastomeric material.

14. A liquid barrier assembly according to claim 1, further comprising a base groove defined in the base wall of at least one of the first and second barriers and an anchoring connector comprising a first portion for disposition in the base groove and a second portion projecting therefrom, the first portion having at least one resiliently deformable locking projection for locking engagement with a surface of the base groove, and the second portion being resiliently deformable and defining a plurality of resiliently deformable sealing projections, wherein when the barrier is placed on the support surface the second portion of the connector is designed to be received in a channel defined in the support surface so as to form a liquid tight seal therewith.

15. A liquid barrier assembly according to claim 14, wherein the or each locking projection of the first portion of the anchoring connector has an asymmetric cross section that is substantially deformable in one direction to permit insertion of the first portion of the connector in the first groove of said first barrier in a direction perpendicular to the plane of the side walls of the barriers and substantially resistant to deformation in the opposite direction to prevent substantial withdrawal of the first portion of the connector from the side groove.

16. A liquid barrier assembly according to claim 14, wherein the anchoring connector is integral with the connector in the side grooves of the barriers.

17. A liquid barrier assembly according to claim 14, wherein the first portion of the connector is connected to the second portion of the connector by an integral web.

18. A liquid barrier assembly according to claim 14, wherein the outer surface of the connector is waisted in a region between the first and second portions.

19. A liquid barrier connector for connecting first and second barriers and comprising a first portion for disposition in a first groove of the first barrier and a second portion that projects from the first portion and is designed to be received in a second groove in a second barrier, the first portion defining at least one resiliently deformable locking projection for locking engagement with a surface of the first groove, the second portion being resiliently deformable and defining a plurality of resiliently deformable sealing projections, wherein, in use, when the barriers are juxtaposed in a predetermined manner the second portion of the connector is received in the second groove of the second barrier and compressible such that it can undergo a predetermined deformation so that at least one of the sealing projections is forced towards a surface of the second groove defined in the second barrier so as to form a liquid-tight seal therewith.

20. A kit of parts to be assembled to provide a liquid barrier assembly for the prevention of flow of liquid from one area to an adjacent area, the assembly comprising first and second barriers each comprising a substantially rigid container, each barrier having a front wall against which, in use, liquid is intended to be incident, a base wall which is intended to be in contact with a support surface on which the barrier is to be located, and first and second opposite side walls each having a side groove defined therein, adjacent barriers being connectable to one another by a connector to form a liquid-tight seal between the barriers, wherein the connector comprises a first portion disposed in a first of said side grooves in the first barrier and a second portion projecting from said first of said side grooves, the first portion defining at least one resiliently deformable locking projection for locking engagement with a surface of the first side groove, the second portion being resiliently deformable and defining a plurality of resiliently deformable sealing projections, and wherein when the barriers are juxtaposed in a predetermined manner the second portion of the connector is received in a second groove of the second barrier and compressed such that it undergoes a predetermined deformation so that at least one of the sealing projections is forced towards a surface of the second side groove defined in the second barrier so as to form a liquid-tight seal therewith.

* * * * *